US008888422B2

(12) United States Patent
Miller

(10) Patent No.: US 8,888,422 B2
(45) Date of Patent: Nov. 18, 2014

(54) LOCKING SYSTEM FOR ROLL-OFF CONTAINERS

(71) Applicant: Nathan Miller, Dearborn Heights, MI (US)

(72) Inventor: Nathan Miller, Dearborn Heights, MI (US)

( * ) Notice: Subject to any disclaimer, the term of this patent is extended or adjusted under 35 U.S.C. 154(b) by 0 days.

(21) Appl. No.: 13/855,938

(22) Filed: Apr. 3, 2013

(65) Prior Publication Data

US 2013/0269400 A1 Oct. 17, 2013

Related U.S. Application Data

(60) Provisional application No. 61/624,520, filed on Apr. 16, 2012.

(51) Int. Cl.
*B60J 5/06* (2006.01)
*E05B 73/00* (2006.01)
*B65D 90/22* (2006.01)

(52) U.S. Cl.
CPC ................ *E05B 73/00* (2013.01); *B65D 90/22* (2013.01); *B65D 2211/00* (2013.01)
USPC ................................................. 410/80; 70/63

(58) Field of Classification Search
CPC .............. B60P 3/341; B60P 3/07; B60P 3/34; B60P 3/122; B60P 3/14; B60P 3/36; B60P 3/42; B60P 3/0252; B60P 3/0257; B60P 3/066; B60P 3/075; B60P 3/1041; B60P 3/38; B60P 3/40; B60P 3/077; B60P 1/435; B60P 3/073; B62D 63/061; B62D 63/062; B62H 3/00; B60T 3/00; B64D 2011/0092; B64D 9/00
USPC ........... 410/80; 280/490.1, 515, 491.1, 479.3; 296/181, 182, 24.1, 61
See application file for complete search history.

(56) References Cited

U.S. PATENT DOCUMENTS

| | | | | |
|---|---|---|---|---|
| 3,041,083 | A * | 6/1962 | Blanc | 280/43.21 |
| 6,120,311 | A * | 9/2000 | Wold et al. | 439/304 |
| 6,283,537 | B1 * | 9/2001 | DeVore, III | 296/182.1 |
| 6,669,269 | B1 * | 12/2003 | Tran-Ngoc | 296/156 |
| 7,267,392 | B1 * | 9/2007 | Rounds | 296/168 |
| 2010/0013189 | A1 * | 1/2010 | Pollock et al. | 280/490.1 |
| 2011/0038453 | A1 * | 2/2011 | Morton et al. | 378/57 |
| 2011/0283753 | A1 * | 11/2011 | Triffle | 70/53 |
| 2011/0316291 | A1 * | 12/2011 | Loughlin et al. | 292/101 |

* cited by examiner

*Primary Examiner* — Glenn Dayoan
*Assistant Examiner* — Sunsurraye Westbrook
(74) *Attorney, Agent, or Firm* — Gifford, Krass, Sprinkle, Anderson & Citkowski, P.C.

(57) ABSTRACT

A locking system including a lock box and a locking bar. The locking bar configured as an elongated member which engages a loading hook of a roll-off container. The locking bar including at least one hole defined therethrough and configured to engage a hasp of a lock. The lock box has an opening defined therethrough and is configured to receive a first portion of the length of the locking handle so that when the locking handle is engaged with the hook a second portion of the length of the locking handle projects from the lock box. This second portion includes at least one of the aforementioned holes and functions to receive a locking hasp. An alternative locking system including a locking sleeve preventing engagement of a bar of a roll-off storage container.

17 Claims, 3 Drawing Sheets

LOCKING SYSTEM FOR ROLL-OFF CONTAINERS

CROSS-REFERENCE TO RELATED APPLICATIONS

This application claims priority of U.S. Provisional Application 61/624,520 filed Apr. 16, 2012, the contents of which are incorporated herein by reference.

FIELD OF THE INVENTION

This invention relates generally to security systems. More specifically, the invention relates to mechanical security systems. Most particularly, the invention relates to a system for locking a roll-off storage container so as to prevent its unauthorized transport.

BACKGROUND OF THE INVENTION

Roll-off containers comprise relatively large wheeled steel bins which may be covered or open. The bins are used to store and transport a variety of materials including trash, scrap metal, finished parts, and the like. In operation, a roll-off container is delivered to a work site on a tilt bed truck. The container is unloaded at the work site by tilting the bed of the truck so as to allow the container to roll off. The container is removed from the work site by engaging a loading hook on the container with a hook attached to a cable driven by a winch associated with the truck. The hook and cable pull the container back onto the truck. The relative ease of moving these containers makes them very amenable to theft which can represent a significant loss for businesses.

Attempts have been made in the prior art to provide systems for locking roll-off containers. However, prior art systems were generally mechanically complex which made them difficult to use and restricted their utility to very particular designs of roll-off containers. As will be explained hereinbelow, the present invention provides a universal locking system for roll-off storage containers. The system of the present invention has a minimal number of parts, is rugged, simple to use, and provides a high degree of security.

SUMMARY OF THE INVENTION

The locking system of the present invention includes a lock box and a handle component. The handle is configured as an elongated member which engages a loading hook of a roll-off container. The handle includes at least one hole defined therethrough and configured to engage a hasp of a lock. The lack box has an opening defined therethrough and is configured to receive a first portion of the length of the locking handle so that when the locking handle is engaged with the hook a second portion of the length of the locking handle projects from the lock box. This second portion includes at least one of the aforementioned holes and functions to receive a locking hasp. An alternative locking system of the present invention including a locking sleeve preventing engagement of a crossbar of a roll-off storage container.

DESCRIPTION OF THE INVENTION

Figure 1:
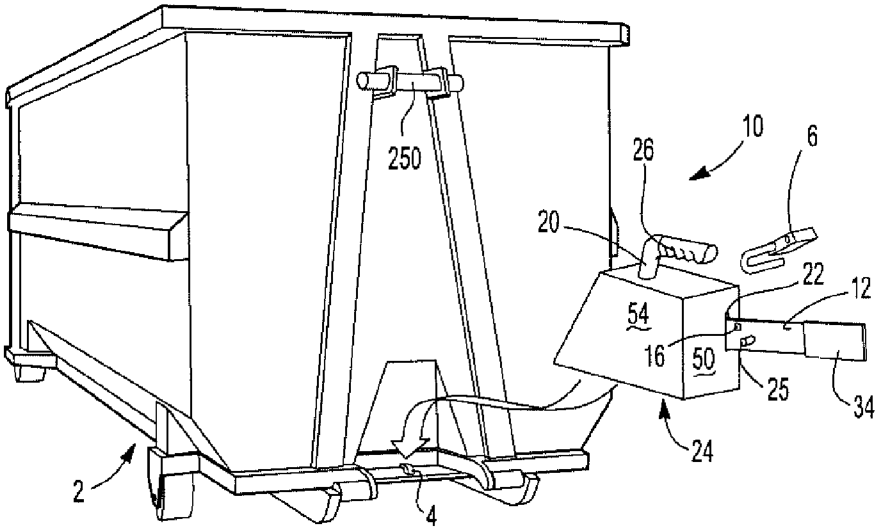
FIG. 1 illustrates a perspective view of the roll-off container and the lock box of the present invention.
Figure 2:
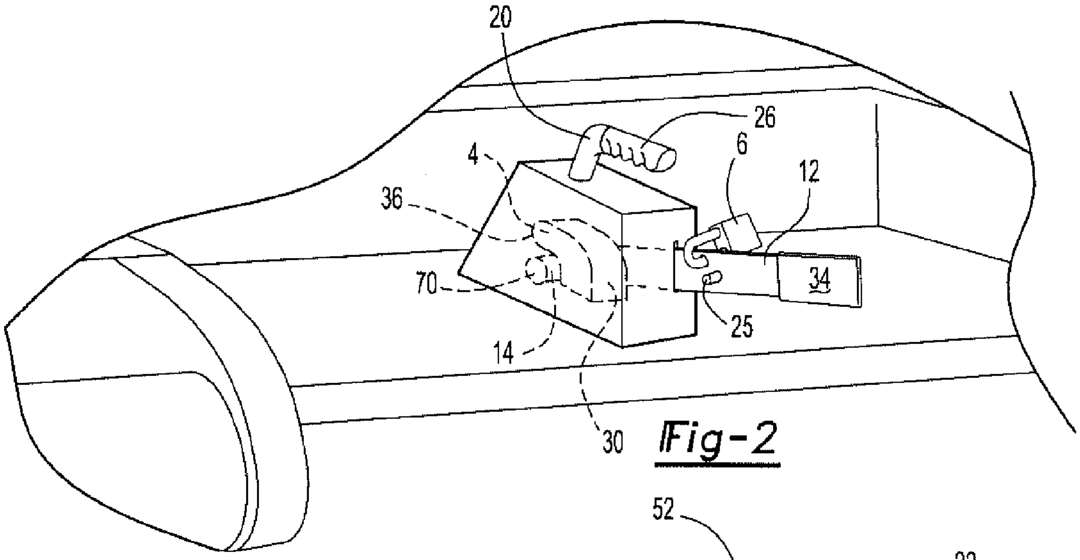
FIG. 2 illustrates a close up perspective view of the installed lock box.
Figure 3:
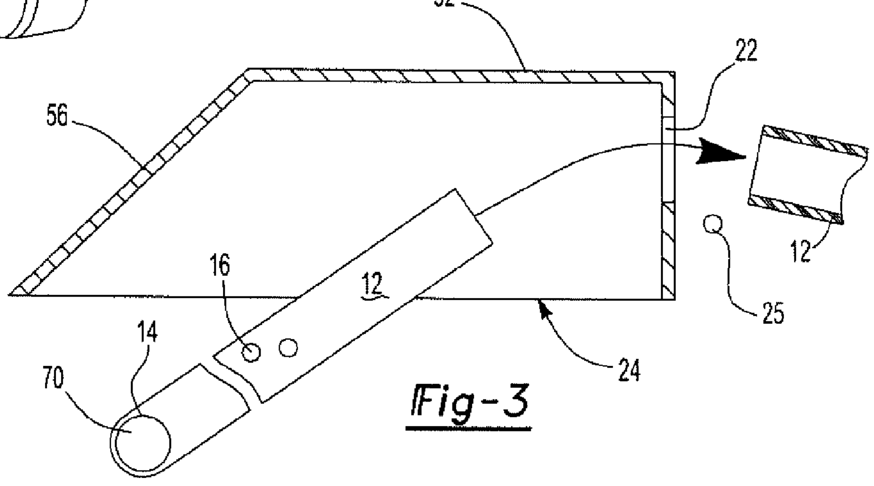
FIG. 3 illustrates a cross-sectional side view of the present invention.

The locking system of the present invention for a roll-off container 2 includes a lock box and a handle component. The handle is configured as an elongated member which engages a loading hook 4 of the roll-off container 2. The handle includes at least one hole defined therethrough and configured to engage a hasp of a lock. The lock box has an opening defined therethrough and is configured to receive a first portion of the length of the locking handle so that when the locking handle is engaged with the hook a second portion of the length of the locking handle projects from the lock box. This second portion includes at least one of the aforementioned holes and functions to receive a locking hasp. The system of the present invention may be implemented in a number of particular embodiments, and some specific embodiments will be shown herein, it being understood that other embodiments are also included within the scope of this invention.

Referring now to FIGS. 1-7, there is shown various views of a locking system 10 of the present invention. The system includes a locking handle 12 which is a generally elongated member, preferably fabricated from steel or some other such high strength material. The locking handle 12 includes an end portion 14 which is configured to engage a loading hook 4 of a roll-off container. The locking handle 12 includes a plurality of holes 16 defined therein. In the present embodiment, the end portion 14 is configured as a cylindrical pin. It is to be understood that other configurations of engagement members such as a slot, a hook, a loop, or the like may also be employed.

There is also shown a lock box 18 which comprises another component of the system. The lock box 18 is configured to receive a portion of the length of the locking bar 12, and to enclose the engagement portion 14 of the locking bar 12. The lock box 18 is also configured to fit over and cover the loading hook of a roll-off container.

Figure 4:
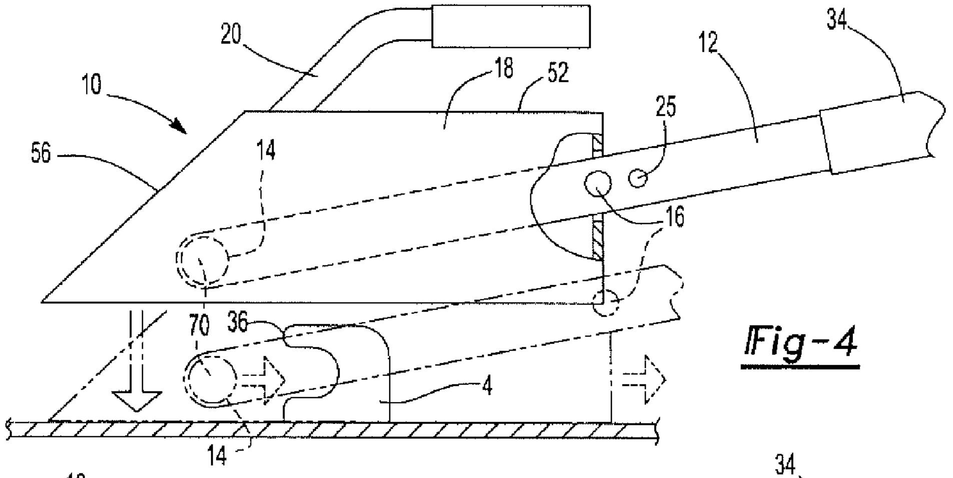
FIG. 4 illustrates a side view and partial cross-sectional view of the lock box being installed over the roll-off container hook.

In the use of the system, as shown in FIG. 4, the engagement portion 14 of the locking handle 12 is connected to the loading hook 4. The lock box 18 is pushed forward as far as possible which then causes at least one of the holes 16 to be disposed on the outside of the box 18. A padlock 6 or the like is then engaged with one or more of the exposed holes 16 so as to secure the assembly thereby blocking access to the loading hook 4 and preventing unauthorized removal of the associated roll-off container 2.

The lock box 18 includes the handle portion 20 as previously described. Further shown is an opening 22 in the back surface 50 of the lock box 18 which opening 22 allows for passage of the locking handle. As previously described, the bottom surface 24 of the lock box 18 is at least partially open so as to allow the lock box 18 to be fit over a loading hook of a container.

The tacking bar 12 includes a gripping portion 34. On an opposite end opposed from the gripping portion 34, the locking bar includes the engagement portion 14. The engagement portion 14 extends away from a side surface 60 of the locking bar 12. In the present embodiment, the engagement portion is generally cylindrical having a free end 70 and an outer surface 68. The outer surface 68 of the engagement portion 14 connects with and engages with the hook 4. The locking bar 12 further includes a pin 25 extending away from the surface 60. The pin 25 may also optionally extend through the locking bar 12. The pin 25 is used to prevent the locking bar 12 from sliding though the opening 22 when the lock box 18 is moved.

Figure 5:
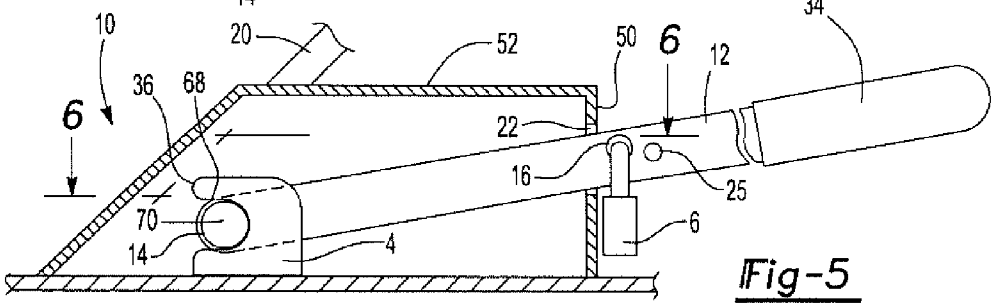
FIG. 5 illustrates a cross-sectional side view of the lock box in an installed position.
Figure 6:
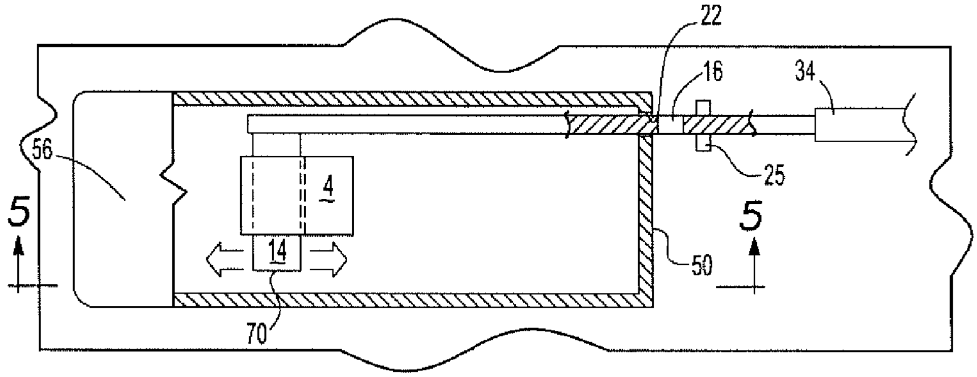
FIG. 6 illustrates a top view of the present invention.
Figure 7:
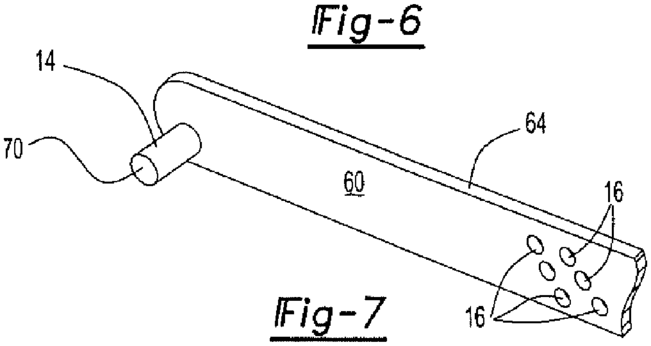
FIG. 7 illustrates the elongated bar of the present invention.

The hook 4 includes an upper outer surface 30 and a lower surface 36. In a locked or engaged position, such as shown in FIG. 5, the outer surface 68 of the engagement potion 14 rests adjacent to the lower surface 36 of the hook 4.

Once the padlock 6 is in place through one of the holes 16, the lock box 18 cannot be removed from the rook 4. To engage the lock box 18 and locking bar 12, the user places the lock box 18 over the hook 4. The user then manipulates the locking bar 12 so that the engagement portion 14 of the locking bar 12 engages with the hook 4. The user then moves the lock box 18 forward to secure the engagement portion 14 with the hook 4. The user then attaches the padlock 6 to the hole 16. The placement prevents an unauthorized user from accessing the hook 4.

To remove the lock box 18 from the hook 4, the user must unlock the padlock and manipulate the locking arm 12 and the engagement portion 14 to unhook the engagement portion 14 from the hook 4. Once the engagement portion 14 is removed from the hook 4, the lock box 18 may be removed from the roll-off container 2.

The lock box 18 also includes an optional carrying handle 20 disposed on its top surface. The handle 20 further includes a gripping portion 26. This handle 20 is not essential but does simplify transport of the system.

It is notable that in the embodiment of FIGS. 1-7 the lock box 18 is configured so as to preclude a towing hook or the like from being readily engaged therewith so as to prevent unauthorized removal of the container. In this regard, the front face 56 of the lock box 18 is rearwardly angled so that any hook or cable attached thereto would slide off when force is applied. Likewise, the carrying handle 20 projects rearwardly and has an angled front face so as to preclude its use as a towing attachment.

The lock box 18 further includes a back wall 50 and side walls 54. The lower surface 24 is positioned to rest on a portion, typically a planar surface, or the roll-off container 2. An upper wall 52 is provided for which the handle 20 extends away from. The back wall 50 and the side walls 54 are generally planar and may include printing, logos or other writing. The lock box 18 and all walls 50, 52, 54 and 56 are made of a metal or other strong and resilient material. The outer surfaces and walls 50, 52, 54 and 56 may also be painted for aesthetic or functional purposes (such as for preventing rust).

Figure 8:
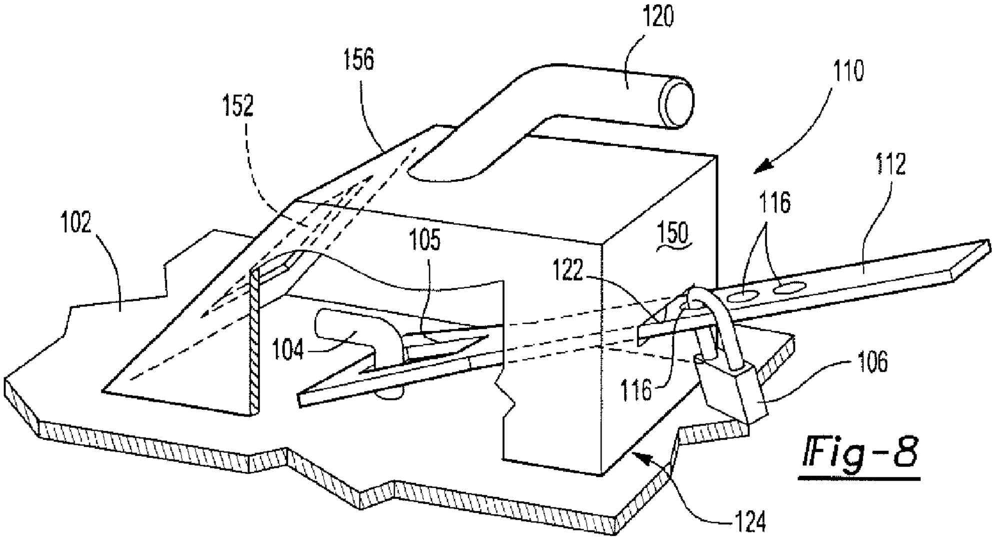
FIG. 8 illustrates a perspective view of an alternative embodiment of the present invention.

Other embodiments of the locking system may be implemented in accord with the present invention, and one such alternative embodiment is shown in FIG. 8.

Referring now to FIG. 8, there is shown a perspective, partially cut away view of a locking system 110 in accord with the present invention. This system 110 includes a locking handle 112 and a lock box 110. FIG. 8 shows the system 110 as engaged with a loading hook 104 of a roll-off container 102.

In this embodiment, the locking bar 112 includes a generally rectangular cut out portion 105 which is disposed at one end of the locking handle 112 and which is operable to engage the loading hook 104. As in the previous embodiment, the locking bar 112 includes a number of holes 116 therethrough which are engageable by a hasp of a padlock 106 or the like. As in the previous embodiment, the engagement portion (or cut out portion 105) engages with the hook 104 to prevent unauthorized access to the hook 104. The user engages the cut out portion 105 of the locking bar 112 with the hook 104, the user then slides the lock box 110 forward to secure the cut out portion 105 with the hook 104 and to expose at least one of the holes 116. The user then secures the lock box 110 with a padlock 106 thereby preventing theft of the roll-off container 102.

In the FIG. 8 embodiment, the lock box 110 includes a carrying handle 120 as previously described. As previously mentioned, the bottom face 124 of the lock box 110 is at least partially cut away so as to allow the box to be fit over the loading hook 104 of the associated container 102. The front face 156 of the lock box 110 includes an opening 152 defined therethrough. This opening 152 is optional but does aid in properly placing the lock box 110 with regard to the loading hook 104 and further aids in engaging the loading hook 104 with the opening 105 in the locking handle 42.

The opening 122 which is defined in the rear face 150 of the lock box 110. This opening 122 permits passage of the locking handle 112 therethrough.

Figure 9:
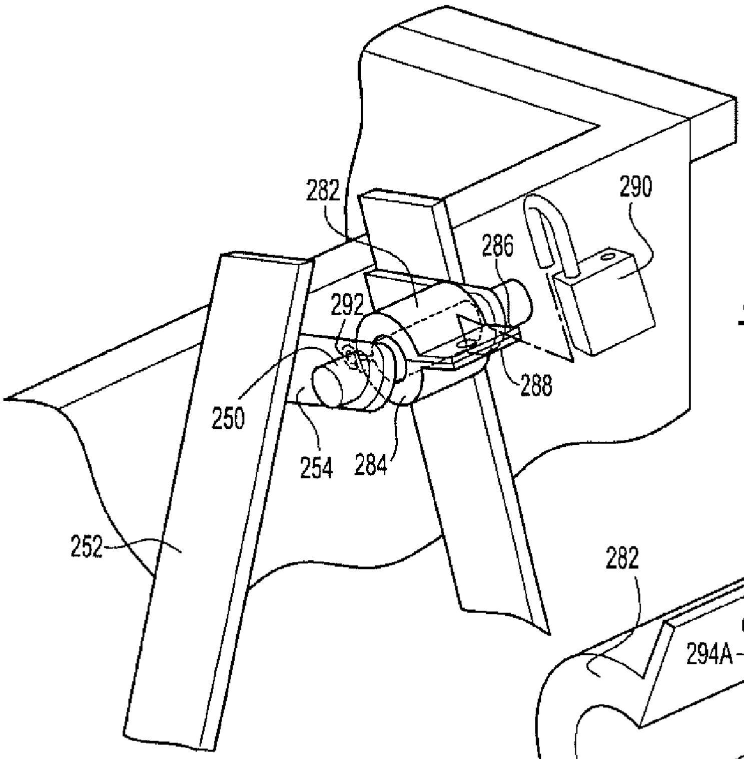
FIG. 9 illustrates a perspective view of yet another alternative embodiment for preventing theft of a roll-off container.
Figure 10:
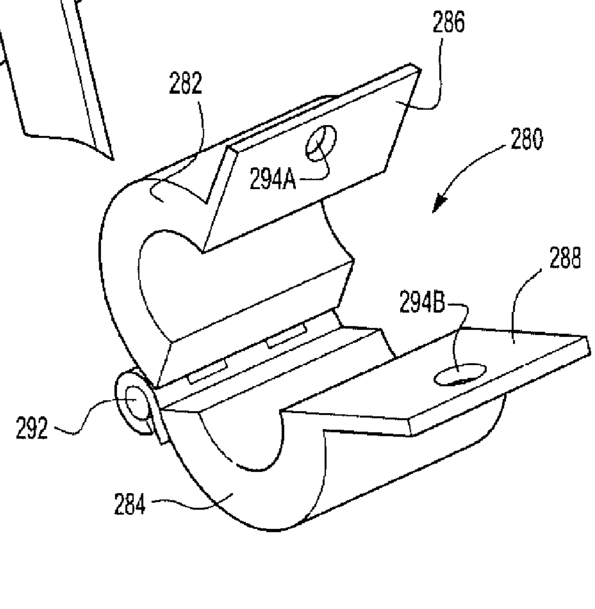
FIG. 10 illustrates a perspective view of a lock of an alternative embodiment of the present invention.

FIGS. 9-10 illustrate a locking sleeve used in connection with the present invention. The locking sleeve 280 includes an upper portion 282 and a lower portion 284. The upper portion 282 and the lower portion 284 are both generally a half circle in shape having an outer edge (outer diameter) and an inner edge (inner diameter). The upper portion 282 and the lower portion 284 rest together to form a generally circular shape as shown in FIG. 9. The upper portion 282 and the lower portion 284 are rotatably connected to each other by means of a roll hinge 292. The roll hinge 292 pivotally connects to the outer edges of the portions 282, 284.

When in a locked and resting position, the upper portion 282 and the lower portion 284 form a generally circular sleeve having an inner diameter and an outer diameter. In the present embodiment the inner diameter is approximately 3 inches and the outer diameter is approximately 7 inches. The upper portion 282 and the lower portion 284 are typically made of a metal such as steel, aluminum or other metal or metal alloy and may alternatively be made of a plastic, polymer, plastic-like or polymer-like material having high strength properties.

The upper portion 282 includes an extension member 286 extending away from the upper portion 282. The extension member 286 includes an aperture **294*a* allowing a lock 290 to pass through to lock the upper portion 282 to the lower portion 284. The lower portion 284 includes a corresponding extension member 288 extending away from the lower portion 284. The extension member 288 also includes an aperture 294*b* operable to allow a lock 290 to pass through and lock the upper portion 282 to the lower portion 284. Each of the extension members 286, 288 are generally planar including a planar surface for which the aperture 294** extends through.

The upper portion 282 and the lower portion 284 are shown from a side view. The present embodiment illustrates the locking sleeve 280 having an outer diameter of 7 inches. The lock 290 is shown in a locked position extending through the aperture 94. The locking sleeve 280 is shown with the roll hinge 292 disposed on the outer edges of the upper portion 282 and the lower portion 284.

FIG. 10 illustrates the locking sleeve 80 in the open position. The locking sleeve 280 is operable to fit around a member 250 (specifically a bar) for which the member rests within the inner diameter of the locking sleeve 280 when the locking sleeve 280 is in a locked position. In the present embodiment, the locking sleeve 280 is operable to fit around a bar 250. The bar is positioned above the hook (see FIG. 1 for positioning) for which the roll off container is moved.

The bar 250 is attached to a pulley (or other moving means, typically by means of a hook attached to a pulley system) when the user wants to move the container. Without a preventative theft means, the roll off container may be easily stolen by attaching a hook/pulley system to the bar 250. When the locking sleeve 280 is locked around the bar, an unauthorized user is not able to securely attach the pulling means to the bar 250 of the roll off container thereby preventing any theft. The sleeve 280 makes the diameter of the bar 250 too large thereby making the diameter too large to fit the standard pulling hook (or other means) around. The diameter of the bar having the locking sleeve engaged is typically between 7-10 inches. The user must remove the locking sleeve 280 before the user is able to fit a hook, or other pulling means, around the bar 250. The bar 250 is supported by supports 252, 245. This typical arrangement of the bar 250 is also illustrated in FIG. 1 (shown without the sleeve in FIG. 1).

The locking sleeve being long enough to substantially cover the length of the engaging bar 250. The locking sleeve 280 must be long enough to substantially cover the length of the engaging bar 250 so that a hook/pulley system cannon engage the engaging bar 250 when the locking sleeve 280 is in place. The locking sleeve must cover at least 50-90% of the outer surface area of the engaging bar 250.

The foregoing drawings and discussion are illustrative of some specific embodiments of the present invention but are not meant to be limitations upon the practice thereof In view of the teaching presented herein, other modifications and variations of the present invention will be apparent to those of skill in the art. It is the following claims, including all equivalents, which define the scope of the invention.

The invention claimed is:

1. A system for locking a roll-off container, said system comprising:

a loading hook, the loading hook connected to the roll-off container;

a locking handle comprising an elongated member configured to directly engage the loading hook on said container, said locking handle having at least one hole defined therethrough, said hole being configured to engage a hasp of a lock; and a lock box having an opening defined therethrough, the lock box defining a compartment, the locking handle extending through the compartment of the lock box to the loading hook, the lock box positioned over the loading hook so as to cover the loading hook, said opening being configured to receive a first portion of the length of said locking handle so that when said locking handle is engaged with said loading hook, a second portion of the length of said locking handle which includes at least one of said at least one hole projects therefrom.

2. The locking system of claim 1, wherein said lock box includes a bottom opening which is configured to allow the lock box to be fit over a loading hook of a roll-off container.

3. The locking system of claim 1, wherein said lock box is configured so as to not present any surface which could function to allow a container to which the locking system is attached to be engaged by a tow hook.

4. The locking system of any one of claims 1, wherein said locking handle includes a bar which is configured to engage said loading hook.

5. The locking system of any one of claims 1, wherein said locking handle includes an opening which is configured to engage said loading hook.

6. The locking system of claim 1, wherein said lock box includes an additional opening disposed in the front thereof.

7. The locking system of any one of claims 1, wherein said system is fabricated from steel.

8. A method for securing a roll-off storage container, said method comprising the steps of:

providing a locking system having a locking handle and a lock box, the lock box having an opening defined therethrough, said opening being configured to receive a first portion of the length of said locking handle;

placing the lock box over a loading hook connected to a roll-off container so as to cover the hook of the roll-off container;

engaging the loading hook of the roll-off container with the locking handle;

disposing the lock box so as to cover said loading hook and so that said second portion of said locking handle projects therefrom; and passing the hasp of a lock through one of said at least one holes in said locking handle.

9. An assembly for preventing theft, the assembly comprising:

a roll-off container, the roll-off container having an engaging bar;

a locking sleeve having a first portion rotatably mounted to a second portion, the first portion and the second portion to create an engaging means between the first portion and the second portion, the engaging means operable to receive the engaging bar of the roll off container, an aperture provided on both the first portion and on the second portion, the apertures configured so as to line up with each other when the locking sleeve is closed around the engaging bar thereby allowing for a hasp of a lock to pass therethrough, the locking sleeve positioned around the engagement bar so as to increase the diameter of the engagement bar thereby preventing unauthorized engagement with the engagement bar by making the engagement bar too wide for a standard hook and pulley system.

10. The assembly of claim 9 wherein the first portion and the second portion are rotatably connected by a hinge.

11. The assembly of claim 9 wherein said locking sleeve is fabricated from steel.

12. The assembly of claim 9 wherein the diameter of the engagement bar and locking sleeve in an installed position ranges between 7-10 inches.

13. The assembly of claim 9 wherein the first portion and the second portion are generally circular in shape.

14. The assembly of claim 9 wherein both the first portion and the second portion have an extended portion.

15. The assembly of claim 14 wherein the apertures of the first portion and the second portion are on the extended portions of the first portion and the second portion.

16. A method for securing a roll-off storage container, said method comprising the steps of:

providing a locking sleeve having a first portion and a second portion;

engaging a bar of a roll-off container with said locking sleeve, the locking sleeve positioned around the bar; and securing the locking sleeve around the bar adjacent the hook of the roll off container thereby increasing the overall diameter of the bar and preventing engagement of a hook and pulley system thereby preventing theft of the roll off container.

17. The method of claim 16 wherein the locking sleeve is secured by a padlock.

* * * * *